(12) United States Patent
Monte et al.

(10) Patent No.: US 6,301,476 B1
(45) Date of Patent: *Oct. 9, 2001

(54) SATELLITE COMMUNICATION SERVICE WITH NON-CONGRUENT SUB-BEAM COVERAGE

(75) Inventors: Paul A Monte, San Jose; Edward Hirshfield, Cupertino, both of CA (US)

(73) Assignee: Globalstar L.P., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/633,694

(22) Filed: Aug. 7, 2000

Related U.S. Application Data (63) Continuation of application No. 08/947,931, filed on Oct. 9, 1997, now Pat. No. 6,101,385.

(51) Int. Cl.[7] ....................................................... H04Q 7/20
(52) U.S. Cl. ......................... 455/427; 455/12.1; 455/13.2
(58) Field of Search ................................... 455/11.1, 12.1, 455/13.2, 13.3, 427, 429, 430, 422, 450, 452, 454; 370/310, 315, 316, 319, 347, 348, 320–337

(56) References Cited

U.S. PATENT DOCUMENTS

| Re. 32,905 | 4/1989 | Baran ..................................... 370/104 |
| 4,144,495 | * 3/1979 | Metzger ................................ 342/353 |
| 4,901,307 | 2/1990 | Gilhousen et al. .................... 370/18 |

(List continued on next page.)

FOREIGN PATENT DOCUMENTS

| 0 421 698 A2 | 10/1991 | (EP) . |
| WO 90/13186 | 11/1990 | (WO) . |
| WO 91/09473 | 6/1991 | (WO) . |
| WO 93/09613 | 5/1993 | (WO) . |

OTHER PUBLICATIONS

Petition of American Mobile Satellite Corporation Before the FCC, Washington, DC 20554, dated Jun. 3, 1991, pp 1–15.

Application of Motorola Satellite Communications, Inc. for Iridium A Low Earth Orbit Mobile Satellite System before the FCC, Washington, D.C. Dec. 1990, pp. 49–96.

(List continued on next page.)

*Primary Examiner*—Dwayne Bost
*Assistant Examiner*—Jean A Gelin
(74) *Attorney, Agent, or Firm*—Ohlandt, Greeley, Ruggiero & Perle, L.L.P.

(57) ABSTRACT

A method for use in a satellite communications system (20) of a type that has at least one satellite (22) having forward and reverse beams each comprised of sub-beams for relaying user communications between a ground station (24) and user terminals (30). In a first embodiment forward and reverse antenna systems are separately optimized for their intended applications without regard for maintaining congruence between antenna beam sub-beams at the surface of the earth. In a second embodiment a method optimizes signal flow between the ground station and the user terminals and includes the steps of: (a) determining user terminal RF signal conditions within the sub-beams of at least one of the forward and reverse beams; and (b) in response to the determined RF signal conditions, re-allocating sub-beams of at least one of the forward and reverse beams such that the totality of the sub-beams of the forward beam are non-congruent with the totality of the sub-beams of the reverse beam, at the surface of the earth, while maintaining the forward beam substantially congruent with the reverse beam, at the surface of the earth. The step of determining includes a step of maintaining a database that stores a map of the sub-beams. In one embodiment of this invention the steps of determining and maintaining are executed at the ground station, while in another embodiment the steps of determining and maintaining are executed on-board the satellite.

11 Claims, 4 Drawing Sheets

U.S. PATENT DOCUMENTS

| | | | |
|---|---|---|---|
| 5,010,317 | | 4/1991 | Schwendeman et al. ......... 340/311.1 |
| 5,073,900 | | 12/1991 | Mallinckrodt ............................ 375/1 |
| 5,081,703 | | 1/1992 | Lee ........................................ 455/13 |
| 5,109,390 | | 4/1992 | Gilhousen et al. ...................... 375/1 |
| 5,119,225 | | 6/1992 | Grant et al. ........................... 359/172 |
| 5,216,427 | | 6/1993 | Yan et al. ............................. 342/352 |
| 5,233,626 | | 8/1993 | Ames ....................................... 375/1 |
| 5,239,671 | | 8/1993 | Linquist et al. .................... 455/13.1 |
| 5,265,119 | | 11/1993 | Gilhousen et al. ...................... 375/1 |
| 5,303,286 | | 4/1994 | Wiedeman ............................. 379/59 |
| 5,339,330 | | 8/1994 | Mallinckrodt ............................ 375/1 |
| 5,410,728 | | 4/1995 | Bertiger et al. ..................... 455/13.1 |
| 5,415,368 | | 5/1995 | Horstein et al. ................. 244/158 R |
| 5,422,647 | * | 6/1995 | Hirshfield et al. .................. 342/354 |
| 5,433,726 | | 7/1995 | Horstein et al. ................. 244/158 R |
| 5,439,190 | | 8/1995 | Horstein et al. ..................... 244/158 |
| 5,446,756 | | 8/1995 | Mallinckrodt ....................... 375/200 |
| 5,448,623 | | 9/1995 | Wiedeman et al. .................... 379/59 |
| 5,548,801 | * | 8/1996 | Araki et al. ......................... 455/13.1 |
| 5,551,624 | | 9/1996 | Horstein et al. ................. 244/158 R |
| 5,552,798 | | 9/1996 | Dietrich et al. ...................... 343/893 |
| 5,758,260 | * | 5/1998 | Wiedeman ......................... 455/12.1 |
| 5,765,098 | | 6/1998 | Bella ................................... 455/43.3 |
| 5,867,109 | | 2/1999 | Wiedeman ......................... 455/13.1 |
| 5,905,943 | | 5/1999 | Wiedeman et al. .................. 455/427 |
| 5,907,541 | | 5/1999 | Fairholm et al. .................... 455/427 |
| 5,920,284 | * | 7/1999 | Victor .............................. 342/357.01 |
| 5,926,758 | * | 7/1999 | Grybos et al. ....................... 455/429 |
| 6,014,372 | | 1/2000 | Kent et al. ............................ 455/427 |
| 6,115,366 | * | 9/2000 | Campanella et al. ................ 370/319 |

OTHER PUBLICATIONS

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. for Authority to Construct a New Communications Satellite System Odyssey$^{SM}$ before the FCC, Washington, D.C. 20554, May 31, 1991 pp. 33–51.

Application of Ellipsat Corporation Ellipsat for the Authority to Construct Ellipso® I An Elliptical Orbit Satellite System, before the FCC, Washington, D.C. 20554, Nov. 2, 1990, pp. 5–34.

Application of Loral Cellular Systems, Corp., Globalstar Mobile COmmunications Wherever You Are, before the FCC, Washington, D.C. Jun. 3, 1991, pp. 94–187.

"An Integrated Satellite–Cellular Land Mobile System for Europe", E. Del Re, University of Florence, Dept. of Electronics Engineering, italy, Sep. 21, 1989.

Current and Future Mobile Satellite Communication Systems, S. Kato et al., IEICE Transactions, vol. E 74, No. 8 Aug. 1991, pp. 2201–2210.

"Digital Network Oriented Mobile Radio Satellite System as an Integrated Part of The GSM Cellular Radio System in Europe", P. Dondl, Deutsch BUndespost/Fernmeldetechniches Zentralmt/Darmstadt, Sep. 21, 1989 Fed. Rep. Germ.

"The OmniTRACS® Mobile Satellite Communications and Positioning System", E. Tiedemann, Jr. et al., Vehicle Electronics in the 90's: Proceedings of the In'l. Congress on Transporation Electronics, 10/90.

"Software Implementation of a PN Spread Spectrum Receiver to Accommodate Dynamics", C. Cahn et al., IEEE Trans. on Comm., vol. COM–25, No. 8, Aug. 1977.

"A Communication Technique for Multipath Channels", R. Price, Proceedings of the IR, Mar. 1958, pp. 555–570.

"Increased Capacity Using CDMA for Mobile Satellite Communication", K. Gilhousen et al., IEEE Journal on Selected Areas in Communications, vol. 8, No. 4, May 1990, pp. 503–514.

"The Iridium$^{TM1}$ System—A Revolutionary Satellite Communications System Developed with Innovative Applications of Technology", D. Sterling et al., IEEE, MILCOM Nov. 4–7, 1991.

"Iridium: Key to Worldwide Cellular Communications", J. Foley, Telecommunications, Oct. 1991, pp. 23–28.

* cited by examiner

SATELLITE COMMUNICATION SERVICE WITH NON-CONGRUENT SUB-BEAM COVERAGE

This is a continuation of application Ser. No. 08/947,931, filed Oct. 9, 1997. now Pat. No. 6,101,385

FIELD OF THE INVENTION

This invention relates generally to satellite communications systems and, in particular, to satellite communications systems that are operable with hand-held user terminals for providing communication links to existing telephone and/or network infrastructures.

BACKGROUND OF THE INVENTION

Satellite telephone systems are emerging as a new and important global business. These systems utilize many individual circuits routed through one satellite or a constellation of many satellites to provide communications for terrestrial terminals. One significant advantage of the satellite telephone system is that it provides ubiquitous coverage of large areas of the earth without requiring the construction of many small terrestrial cells.

In the past, satellites have employed antennas that produce antenna beams to provide coverage to areas occupied by users or subscribers. For full duplex communication systems, it has been the practice for the beam pattern of the region covered by the antenna for transmission to be identical to the beam pattern of the region covered by the antenna for reception; i.e., the beam pattern of the regions for transmission is congruent with the beam pattern of the region covered for reception.

It has also been the practice to fill desired satellite service regions with more than one beam when there has been insufficient allocated bandwidth (frequency range) to serve a required number of users with a required bandwidth, and to lower the power requirements of both the satellites and the earth stations. This approach relies on the re-use of the allocated bandwidth with spatial diversity. Spatial diversity is established by dividing the service region into sub-regions, and employing separate and unique smaller beams or sub-beams to serve each service sub-region. This technique enables frequency re-use through spatial diversity, wherein adjacent sub-beams operate at different frequencies, and wherein non-adjacent sub-beams may use the same frequency, thereby avoiding interference between the users located in the non-adjacent sub-beams.

Figure 1:
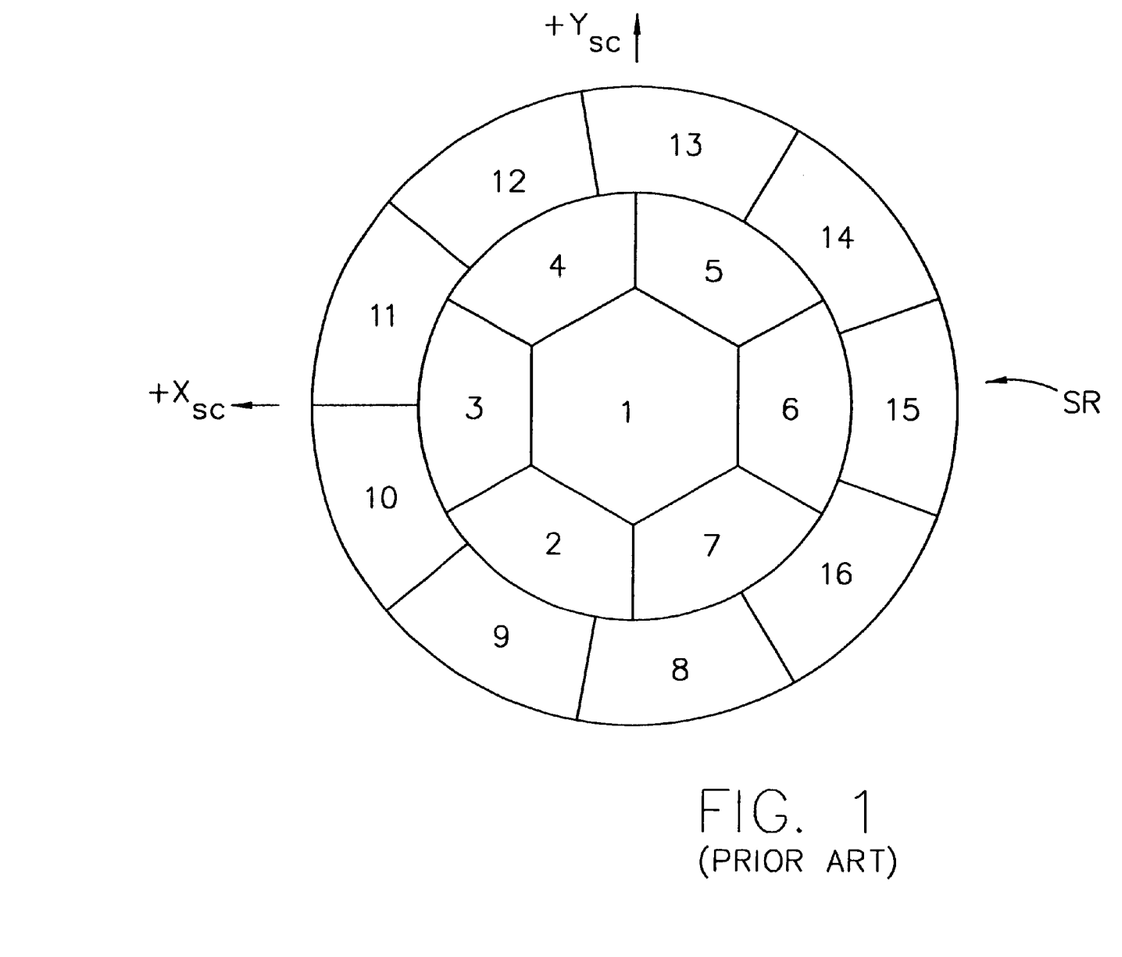
FIG. 1 illustrates conventional uplink and downlink congruent sub-beam assignments as viewed from a satellite, looking at earth nadir.

In the past, the transmission sub-regions (or sub-beams) have been defined to be the same shape and size as the corresponding reception sub-regions (or sub-beams). This is typically done in order to simplify signal routing and the overall system architecture. FIG. 1 depicts an example of a multibeam antenna beam pattern that can be used for both reception by user terminals (downlink) and transmission from user terminals (uplink). That is, the downlink beam pattern and the uplink beam pattern are substantially identical, or congruent, at the surface of the earth. In FIG. 1 the service region (SR) is partitioned into 16 sub-regions, individual ones of which are serviced by one sub-beam (assuming no sub-beam overlap). The pattern is characterized by a central sub-beam 1, a ring of six inner sub-beams (2–7), and a ring of nine outer sub-beams (8–16). Phased arrays are one suitable antenna type for generating such beam patterns. Reference in this regard can be had to, by example, U.S. Pat. No. 5,422,647, issued Jun. 6, 1995, entitled "Mobile Communication Satellite Payload", by E. Hirshfield and C. A. Tsao; U.S. Pat. No. 5,283,587, issued Feb. 1, 1994, entitled "Active Transmit Phased Array Antenna", by E. Hirshfield; and to U.S. Pat. No. 5,504,493, issued Apr. 2, 1996, entitled "Active Transmit Phased Array Antenna with Amplitude Taper", by E. Hirshfield.

More particularly, in the past satellites used for duplex communications have (as best as could be designed) congruent antenna beam coverage areas for a given uplink and downlink. For example, if a satellite has a certain coverage area and that coverage area is covered by sixteen separate beams (sub-beams) for the uplink and downlink, the sixteen beam coverage areas for the uplink are the same coverage areas for the downlink (with boundary lines located within, for example, 30 miles of one another), as shown in FIG. 1.

That is, in the conventional implementations of satellites used for duplex communications, the antenna beam area of the service links was designed to be the same for the uplink and the downlink. This was done for simplicity in satellite antenna design, simplicity in ground operations, and, when using conventional parabolic antennas, the antenna design optimization could be the same for the uplink frequency and the downlink frequency.

The inventors have realized that the use of fixed congruent sub-beams for transmission and reception, as in FIG. 1, can in some instances result in inefficiencies and a loss of overall system flexibility.

OBJECTS AND ADVANTAGES OF THE INVENTION

It is a first object and advantage of the invention to provide a satellite communication system having sub-beam patterns that overcome the foregoing and other problems.

It is a further object and advantage of this invention to provide a satellite communication system wherein individual satellites each service a congruent uplink and downlink service region, but wherein the sub-regions (or sub-beams) are non-congruent.

It is a further object of this invention to provide a satellite communication system that employs non-congruent antenna beam coverage areas for the uplink and downlink, with the antenna beam coverage areas being separately optimized for each of the uplink and the downlink without consideration for the antenna beam coverage areas of the other.

It is one further object of this invention to provide a satellite communication system wherein individual satellites each service a congruent uplink and downlink service region, but wherein the sub-regions (or sub-beams) are non-congruent, and wherein the shapes of the sub-regions can be dynamically controlled, either from a ground station or the satellite, as a function of current or expected signal routing constraints, system loading, and other factors.

SUMMARY OF THE INVENTION

The foregoing and other problems are overcome and the objects of the invention are realized by methods and apparatus in accordance with embodiments of this invention.

The inventors have realized that user terminal service links do not require congruent antenna beam coverage areas because the gateway (in the case of a repeater satellite) or the satellite (in the case of a satellite that performs on-board signal processing) can determine which beam a given user is located in separately for the uplink and the downlink. With the advent of modern antenna designs (e.g., phased arrays, both passive and active), the optimization in antenna gain pattern for the downlink (transmitting) satellite antenna may not lead to the same antenna beam coverage areas as the antenna beam coverage areas that are optimized in antenna gain pattern for the uplink (receiving) satellite antenna. These different antenna beam coverage areas can be accommodated with knowledge of the patterns on the ground in the gateway or in the satellite.

As such, in accordance with this invention a communication satellite has a downlink transmit service antenna and an uplink receive service antenna, wherein the downlink transmit service antenna and the uplink receive service antenna are separately optimized for their intended functions without regard for maintaining congruency, at the ground, of the individual sub-beams or coverage areas of the two antennas.

Also disclosed is a method for use in a satellite communications system of a type that has at least one satellite having forward and reverse beams each comprised of sub-beams for relaying user communications between a ground station and user terminals. The method optimizes signal flow between the ground station and the user terminals and includes the steps of: (a) determining user terminal RF signal conditions within the sub-beams of at least one of the forward and reverse beams; and (b) in response to the determined RF signal conditions, re-allocating sub-beams of at least one of the forward and reverse beams such that the totality of the sub-beams of the forward beam are non-congruent with the totality of the sub-beams of the reverse beam, at the surface of the earth, while maintaining the forward beam substantially congruent with the reverse beam, at the surface of the earth. The step of determining includes a step of maintaining a database that stores a map of the sub-beams. In one embodiment of this invention the steps of determining and maintaining are executed at the ground station, while in another embodiment the steps of determining and maintaining are executed on-board the satellite.

Also disclosed is a satellite communications system that is constructed so as to implement the foregoing method.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 3:
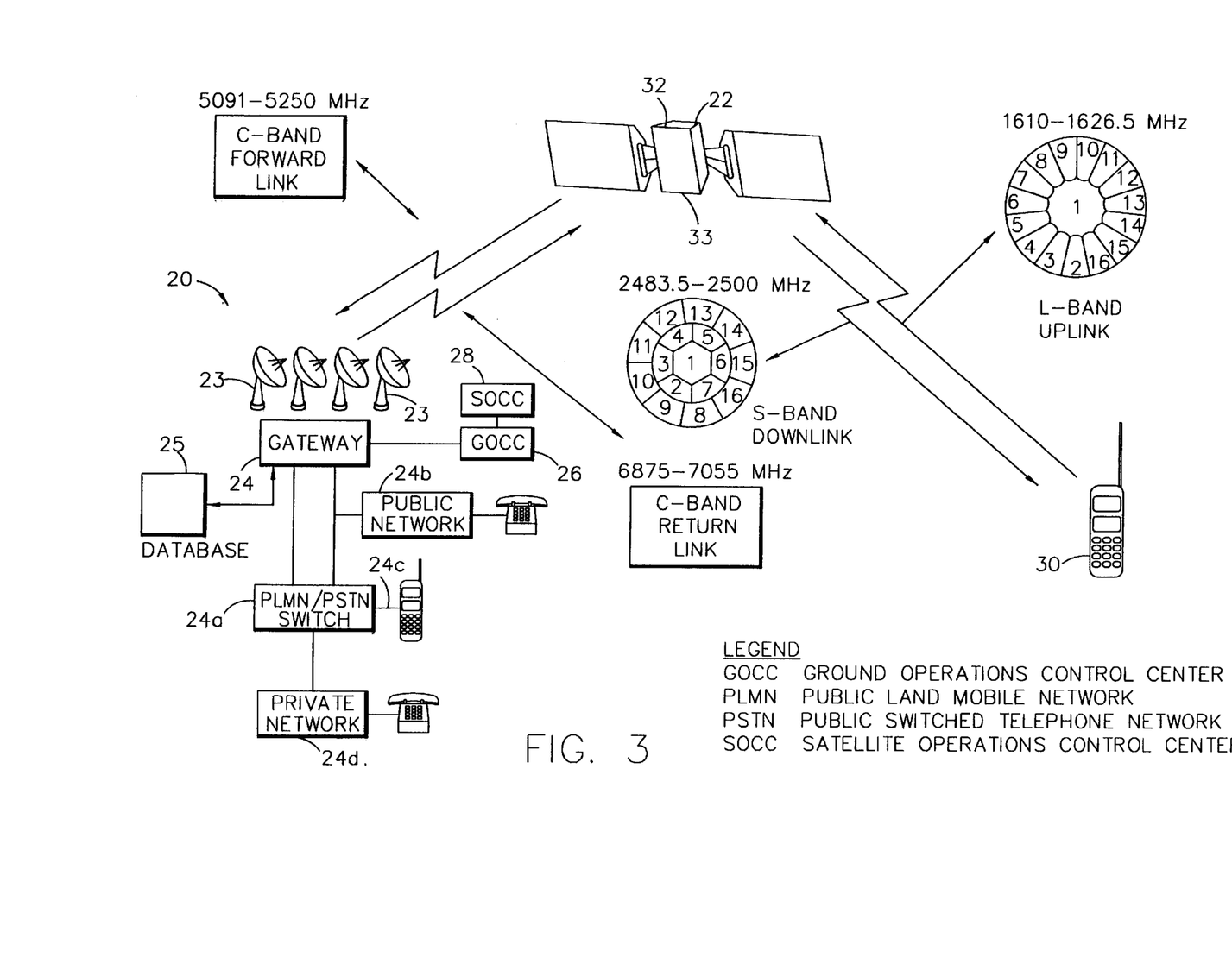
FIG. 3 is block diagram of an embodiment of a satellite communication system that is operated in accordance with this invention.

Referring first to FIG. 3, a block diagram is shown of an embodiment of a satellite communication system 20 that is operated in accordance with this invention. In a presently preferred embodiment of this invention the satellite system 20 is a low earth orbit (LEO) system comprised of a constellation of satellites 22, one or more gateways 24 each having a plurality of steerable antennas 23, a ground operations control center (GOCC) 26, and a satellite operations control center 28. Each of the antennas 23 can be pointed at a different satellite 22, it being assumed that there will typically be two or more satellites in view of the gateway 24 at any given time. A given user terminal 30 communicates with the gateway 24 via one or more of the satellites 22 and a corresponding one or more of the antennas 23. The gateway 24 includes a Public Land Mobile Network (PLMN)/Public Switched Telephone Network (PSTN) switch 24a for bidirectionally connecting the user terminal 30 to various public networks 24b, cellular networks 24c, and private networks 24d.

The following U.S. Patents teach various aspects of a LEO satellite constellation, and the associated communication system, which may be used in conjunction with the satellite system 10 shown in FIG. 1: U.S. Pat. No. 5,422,647, issued Jun. 6, 1995, entitled "Mobile Communication Satellite Payload", by E. Hirshfield and C. A. Tsao; U.S. Pat. No. 5,283,587, issued Feb. 1, 1994, entitled "Active Transmit Phased Array Antenna", by E. Hirshfield; U.S. Pat. No. 5,504,493, issued Apr. 2, 1996, entitled "Active Transmit Phased Array Antenna with Amplitude Taper", by E. Hirshfield; U.S Pat. No. 5,552,798, issued Sep. 3, 1996, entitled "Antenna for Multipath Satellite Communication Links", by F. J. Dietrich and P. A. Monte; and U.S. Pat. No. 5,448,623, issued Sep. 5, 1995, and 5,526,404, issued Jun. 11, 1996, "Satellite Telecommunications System Using Network Coordinating Gateways Operative with a Terrestrial Communication System", by R. A. Wiedeman and P. A. Monte. The disclosures of these various U.S. Patents are incorporated by reference herein in their entireties.

In a presently preferred, but not limiting, embodiment of this invention, there are a total of 48 satellites 22 in, by example, a 1414 km Low Earth Orbit (LEO). The satellites are distributed in eight orbital planes with six equally-spaced satellites per plane (Walker constellation). The orbital planes are inclined at 52 degrees with respect to the equator and each satellite completes an orbit once every 114 minutes. This approach provides approximately full-earth coverage with, preferably, at least two satellites in view at any given time from a particular user location between about 70 degree south latitude and about 70 degree north latitude. As such, the user terminal 30 is enabled to communicate from nearly any point on the earth's surface to other points on the earth's surface via one or more of the gateways 24 (by way of the PLMN/PSTN switch 24a) and one or more of the satellites 22.

Reference in this regard may be had to the above-referenced U.S. Pat. No. 5,422,647, by E. Hirshfield and C. A. Tsao, entitled "Mobile Communications Satellite Payload", which discloses one type of communications satellite having linear amplifiers and phased array transmit and receive antennas. The described satellite payload is suitable for use with the teaching of this invention, as well as are other satellite transponder types. User/gateway communications are accomplished via a spread spectrum (SS), code division multiple access (CDMA) technique. The presently preferred SS-CDMA technique is similar to the TIA/EIA Interim Standard, "Mobile Station-Base Station Compatibility Standard for Dual-Mode Wideband Spread Spectrum Cellular System" TIA/EIA/IS-95, July 1993, although other spread spectrum and CDMA techniques and protocols can be employed. However, Time Division Multiple Access (TDMA) may also be used. Frequency Division Multiple Access (FDMA) can also be employed, as can combinations of these various access techniques.

The low earth orbits of the satellites 22 permit the low-powered fixed or mobile user terminals 30 to communicate via the satellites 22, each of which functions, in one embodiment of this invention, solely as a "bent pipe" repeater to receive a communications traffic signal (such as speech and/or data) from a user terminal 30 or from a gateway 24, to convert the received communications traffic signal to another frequency band, and to then re-transmit the converted signal. However, it should be realized that the teaching of this invention is not limited to "bent pipe" repeater satellites, and can function equally well with on-board processing and regenerative repeater types of satellites. There need be no direct communication link or links between the satellites 22, although such links may be provided if desired.

The user terminals 30 communicate via, by example, L-band RF links (uplink or return link) and S-band RF links (downlink or forward link) through return and forward (linear) satellite transponders, respectively. The return L-band RF links may operate within a frequency range of 1.61 GHz to 1.625 GHz, a bandwidth of 16.5 MHz, and are modulated with in accordance with the preferred spread spectrum technique in multiple 1.25 MHz segments. The forward S-band RF links may operate within a frequency range of 2.485 GHz to 2.5 GHz, a bandwidth of 16.5 MHz, and are also modulated in accordance with the spread spectrum technique in multiple 1.25 MHz segments.

The 16.5 MHz bandwidth of the forward link is partitioned into 13 frequency channels with, by example, up to 128 users being assigned per channel. A given frequency channel is assigned to one (or more) of the sub-beams, with any re-used frequency channels being assigned to non-adjacent sub-beams. The return link may have various bandwidths, and a given user terminal may or may not be assigned a different frequency channel than the frequency channel assigned on the forward link.

The gateway 24 communicates with the satellites 22 via a full duplex RF link comprised of a forward link (to the satellite 22) and a return link (from the satellite 22) that operates within a range of frequencies generally above 3 GHz and preferably in the C-band. The C-band RF links bi-directionally convey the communication feeder links, and also convey satellite commands to the satellites and telemetry information from the satellites. The forward feeder link may operate in the band of 5 GHz to 5.25 GHz, while the return feeder link may operate in the band of 6.875 GHz to 7.055 GHz.

The antenna beam from a LEO satellite can be analogized as a push broom, where a yaw axis of the satellite is the broom's "handle" and where the satellite's coverage area, that is, a region illuminated by the beam, is "pushed" over the earth's surface. The portion of the earth's surface that can be seen from the orbiting LEO satellite at any instant is its coverage footprint. The antenna beam may be all or some portion of the footprint. The coverage area has a size and shape which typically depends on the altitude of the orbit and the elevation angle to the satellite from the extremity of the coverage area footprint. The antenna beam does not necessarily need to be regular in shape, nor does it have to illuminate all of the coverage area. However, for the purposes of this discussion it is assumed that the coverage area is a circular area centered on a point on the earth directly below the satellite. The satellite beam is typically divided into the smaller sub-beams for communications efficiency.

Furthermore, for this discussion it is assumed that the antenna is fixed to the body of the satellite. However, this is not necessary, and the antenna can instead be gimbled and directed to point in some direction with respect to the satellite axes.

Figure 2:
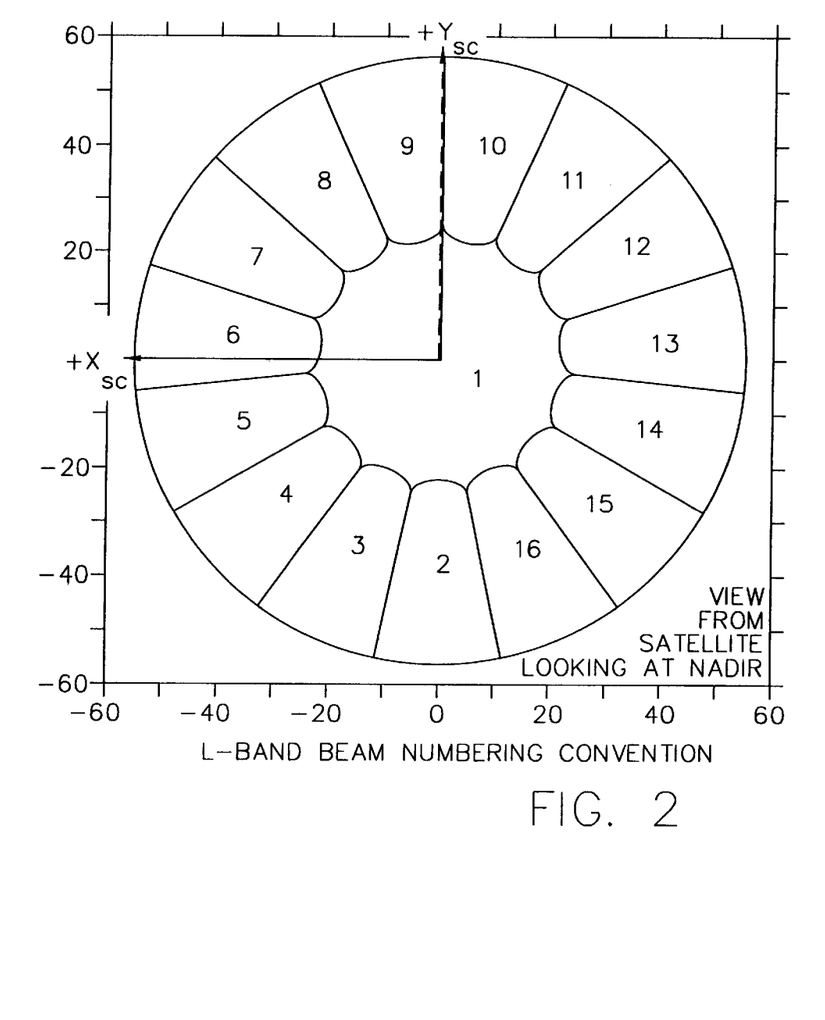
FIG. 2 illustrates an exemplary uplink sub-beam assignment as viewed from a satellite, looking at earth nadir, which is non-congruent with a downlink sub-beam assignment of a type shown in FIG. 1, wherein in FIGS. 1 and 2 the +X axis is a velocity vector of the spacecraft (sc) when operating in an orbit normal mode, the +Y axis is normal to the orbital plane in the direction defined by a right-handed coordinate system, with the +Z axis pointed at the center of the earth, and in FIG. 2 the degrees are given with respect to spacecraft nadir.

Having described a presently preferred, but not limiting, embodiment of a satellite communications system within which the teaching of this invention may be used to advantage, reference is now made to FIG. 2 for illustrating an exemplary antenna pattern of sub-beams in accordance with the teachings of this invention.

The use of this invention preserves the principle of congruent coverage for satellite communication taken as a whole, but establishes non-congruent sub-regions to enable optimization of the transmission sub-regions according to principles governing a most efficient transmission, and also optimization of the reception sub-regions according to principles governing most efficient reception. It is noted that the criteria in some systems are different for efficient transmission than for efficient reception.

By example, due to the difference in frequency between the L band uplink and the S band downlink to the user terminal 30, these links will typically experience different, and varying, amounts of attenuation and fading due to the presence of rain, foliage, and other such RF signal path impairments.

Further by example, differences in allowable amounts of transmitted power may exist between the uplink and the downlink. Also, the presence of RF noise sources, terrestrial RF links, and/or other satellite systems, that operate in frequency bands that overlap or that are co-frequency with the L band and S band frequencies, may introduce varying levels of interference in different frequency bands. These interference levels may change with time over the course of hours or days, and may furthermore shift among the set of frequency bands or channels that are individually assigned to individual ones of the sub-beams. By example, certain frequency bands may experience high levels of interference only during certain hours of the day, while at other times the levels of interference are negligible.

As such, it can be appreciated that congruence between the sub-beams of the uplink beam and the sub-beams of the downlink beam may be less than desirable.

This leads to antenna beam coverage areas that are non-congruent, as shown in FIG. 2 when compared to FIG. 1. There are different reasons that various optimizations can lead to non-congruent beams.

A first reason is, given that the transmit and receive frequencies are different and that the antennas can be the same size, the beam pattern of the antenna with the higher frequency can be shaped more sharply, with the same size aperture for both antennas, than the antenna with the lower frequency. This may lead to non-congruent beams when optimizing both the transmit and receive frequencies.

A second reason is that amplitude taper and phase control are preferably used to optimize antenna patterns. Amplitude taper and phase control can be used together or separately. When used together amplitude taper and phase control give more degrees of freedom in the antenna design and, therefore, lead to more well defined antenna patterns (i.e., a higher average gain over each beam). For some antennas, such as a phased array (whether used on a satellite or not), there may be thermal gradients across the antenna aperture which may distort the antenna beam patterns. The presence of such thermal gradients can impose amplitude taper constraints on the typically much higher power transmit (downlink) antenna. Thus, an optimization of antenna performance with amplitude taper constraints on the transmit antenna, and not on the receive antenna, may lead to non-congruent beams.

Also, when considering amplitude taper and phase control with a linear or semi-linear transmit requirement, it is desirable to drive all elements with the same power at the same instant. This linear requirement can constrain the transmit antenna to have only phase control and no amplitude taper. With only phase control on the transmit antenna and both phase and amplitude control on the receive antenna, the separate optimization of each antenna may lead to non-congruent beams.

Furthermore, the optimization of antenna beams typically implies high gain in the desired area of coverage and lower gain in the undesired area of coverage. This in turn leads to higher average gain, higher beam efficiency, low side lobes, and low beam overlap. Thus, if a sharper, more defined beam shape can be achieved on the receive antenna by use of amplitude and phase taper, but only phase taper on the transmit antenna, it is desirable to take advantage of the improved receive antenna even if the same cannot be achieved for the transmit antenna.

In accordance with the teachings of this invention there is provided an ability to separately change the shape of the beams, as well as the number of beams, on the uplink and the downlink. The variation in beam shape and/or number may be done statically (i.e., making the beam shapes and/or number permanent), or can be made to vary in accordance with a predetermined plan, or may be dynamically varied in response to changing conditions.

For example, the beams can be changed by changing the amplitude and phase of the elements of an antenna. The beams can also be changed by moving the lens of a lensed antenna.

In a given example, all of the various considerations discussed above may be present (i.e., same antenna size and different frequency, thermal constraints, and linear amplification constraints). When the average gain over each beam and the beam efficiency (e.g., a low beam overlap) are optimized, the uplink and downlink antennas are non-congruent, as when comparing FIG. 1 to FIG. 2. Given the constraints of a particular antenna implementation, the use of non-congruent beams in accordance with the teaching of this invention yields better optimized antenna performance to deliver higher traffic capacity.

Furthermore, in the presently preferred embodiment the gateway 24 is enabled to accurately determine the location of a given one of the user terminals 30 through the use of, by example, position location measurements. This is typically done when the user terminal 30 first requests service. Knowing the location of the user terminal 30, and also the locations, shapes and sizes of the various sub-beams of the uplink and downlink beams at any point in time (based on satellite ephemeris data and a knowledge of the transmit and receive antenna system characteristics), the gateway 24 can determine which sub-beams the user terminal is located in for both the uplink and the downlink, and can assign traffic channel frequencies accordingly.

In general, a satellite communications system can provide enhanced performance if there is high gain (sharper beams) directed towards higher traffic density areas, and lower gain (broader beams) directed at the low traffic density areas. These considerations are important for the embodiment using pre-planned changes and/or dynamic changes in the beam patterns and/or numbers. Given a certain user traffic density, an optimal beam pattern can be defined. The beam pattern will change over time as the traffic changes or as the satellite moves over the traffic areas. An optimum change in the beam pattern, or re-allocation of sub-beams, may thus be determined in advance based upon a historical traffic database, or may be changed dynamically, in real-time, as traffic demand changes.

It is also within the scope of the invention to operate in accordance with a predetermined sub-beam allocation plan, and to dynamically modify the predetermined plan as needed to accommodate changes in demand, the addition of new subscribers, and other events.

The satellite communications system will also provide enhanced performance if there is there is high gain directed towards areas where interference is high to provide a better quality of service for the users in areas experiencing high interference. The interference could be due to external systems (terrestrial or satellite) or due to signal attenuation (trees, buildings, etc.). Of course, if there is an area with high interference and little or no communications traffic, it is also desirable to have a minimum gain directed towards that area for the uplink antenna. For the case of a high interference area with few users, it may be most efficient to have high gain on the downlink antenna and low gain on the uplink antenna. This condition leads to the use of non-congruent beams in accordance with the teaching of this invention.

For example, desired beam patterns could be uploaded by command from a gateway 24 to indicate the locations of major cities. In response the satellite 22 provides higher gain beams directed towards the major cities, either because there is more signal attenuation present in the urban environment, or because the traffic is denser, or because of the presence of a terrestrial system which uses the same frequencies, leading to increased interference.

Furthermore, if the satellite 22 is in elliptical orbit (an orbit where the satellite altitude changes), in order to maintain a constant beam size at the earth's surface, the beam shape has to change (i.e., the beams shape must become sharper as the satellite altitude increases).

In any of the above cases, it may be most efficient to change the number of beams as well in order to obtain the highest possible directional beams(s) on areas with high traffic demand, or to decrease the amount of power used by beams which are on but not being used.

In accordance with an aspect of the teaching of this invention the gateway 24, or some other ground station connected to the gateway 24, includes a database 25 wherein maps are maintained of the coverage areas of each sub-beam of each satellite 22 that the gateway 24 is communicating through. Within each sub-beam are user terminals 30 that are communicating with the gateways 24. An indication of user terminal interference and general RF operating conditions is sensed by the gateway 24 from, by example, a power control request from the user terminal 30 that is transmitted on the L band return link and the associated C band return feeder link. In general, the gateway 24, using its closed loop user terminal power control equipment, responds by increasing (or decreasing) the power used by the satellite 22 to overcome the interference. Since the location of the user terminal (i.e., identity of the sub-beam) and the amount of power used by the user terminal 30 is known by the gateway 24, it is possible to quantize this information and store it in the database 25. Another indication of the RF conditions within a given sub-beam can be determined from a bit error rate required in the channel to achieve reliable bi-directional communications. For example, if the gateway 24 finds that it receives the user terminal transmission with a low bit, word or frame error rate, but that the user terminal 30 indicates through re-transmission requests that it is not reliably receiving the forward link transmissions it may be inferred that the forward link (S band) is more impaired than the reverse link (L band) for a given one of the sub-beams and its associated frequency channel. The reverse situation may also exist. The gateway 24 may also request that the user terminals periodically measure the power and/or signal quality of the forward link and report the results back to the gateway. It can be further appreciated that, even under ideal RF propagation and interference conditions, the user terminals 30 located in the outer sub-beams (e.g., 13, 14 and 15 of FIG. 1) may experience a different RF signal quality than the user terminals 30 located in the inner sub-beams (e.g., 1, 4, 5 of FIG. 1).

Having made a determination of the RF signal quality of each of the sub-beams of at least the reverse beam, and having stored this information in the database 25, the gateway 24 is enabled to modify or re-allocate the locations of the sub-beams so as to optimize the conditions for RF signal reception by the gateway 24 (and/or by the user terminals 30).

By example, and referring also to FIG. 2, there is illustrated an exemplary uplink (reverse) sub-beam assignment as viewed from the satellite 22, looking at earth nadir, which can be seen to be non-congruent with the downlink (forward) sub-beam assignment of a type shown in FIG. 1. In accordance with the teaching of this invention two beams may be considered to be congruent if each has a same number of sub-beams having sub-beam boundaries that are offset from one another, at the surface of the earth, within some predetermined threshold (e.g., 50 miles or less). Normally the beams are intended to be congruent, and any differences at the surface of the earth are due to imperfections and mismatches in the satellite transmit and receive antennas. Conversely, two beams are non-congruent if the sub-beam boundaries are intentionally made to differ from one another, and/or if different numbers of sub-beams are used, and/or if no attempt is made to preserve any overlap between like sub-beams.

If it is assumed that the forward link sub-beam distribution is as is shown in FIG. 1, then the sub-beams of the reverse link as shown in FIG. 2 are clearly not congruent with the sub-beams of the forward link. However, the overall beam (i.e., the region that bounds the totality of the forward and reverse sub-beams) may be congruent at the surface of the earth. That is, both beams may centered at approximately the same point on the earth's surface, and the beam perimeters may be substantially equal in size and shape.

In the illustrated example all of the user terminals 30 located at about the center of the beam pattern will find themselves in sub-beam 1 for both the forward and reverse links. However, those user terminals 30 that are located in the forward link sub-beams 7 and 8 (FIG. 1) will find that they have been assigned by the gateway 24 to one of reverse link sub-beams 1 or 2 (FIG. 2), depending on their distance from the center of the beam pattern.

The gateway 24 determines the distribution of the reverse link sub-beams in accordance with the above-mentioned pre-planned beam shape assignments, and/or from the information stored in the database 25, and in accordance with the goal of separately optimizing both the forward and the reverse link quality for the user terminals 30 within the service region or coverage area of the satellite 22, given the constraints imposed by differences in frequency, differences in thermal gradients across the satellite antennas, etc.

It can be appreciated that the sub-beam assignments for both the uplink and downlink can be changed by the gateway 24 as RF signal propagation conditions warrant. Such changes can be made as a function of, by example, system loading, an amount of external interference from terrestrial RF sources, an amount of external interference from other satellite communication systems, weather conditions within the service region, and other factors. The desired result is to employ the gateway 24 to maintain maps of the coverage areas of each antenna sub-beam, and to route user terminal signals as required to establish and maintain connectivity.

The control of the locations of the various sub-beams is achieved by the use of phased arrays on the satellite 22 for establishing the forward and reverse user links, and through the use of known types of beam steering techniques for the phased arrays.

Figure 4:
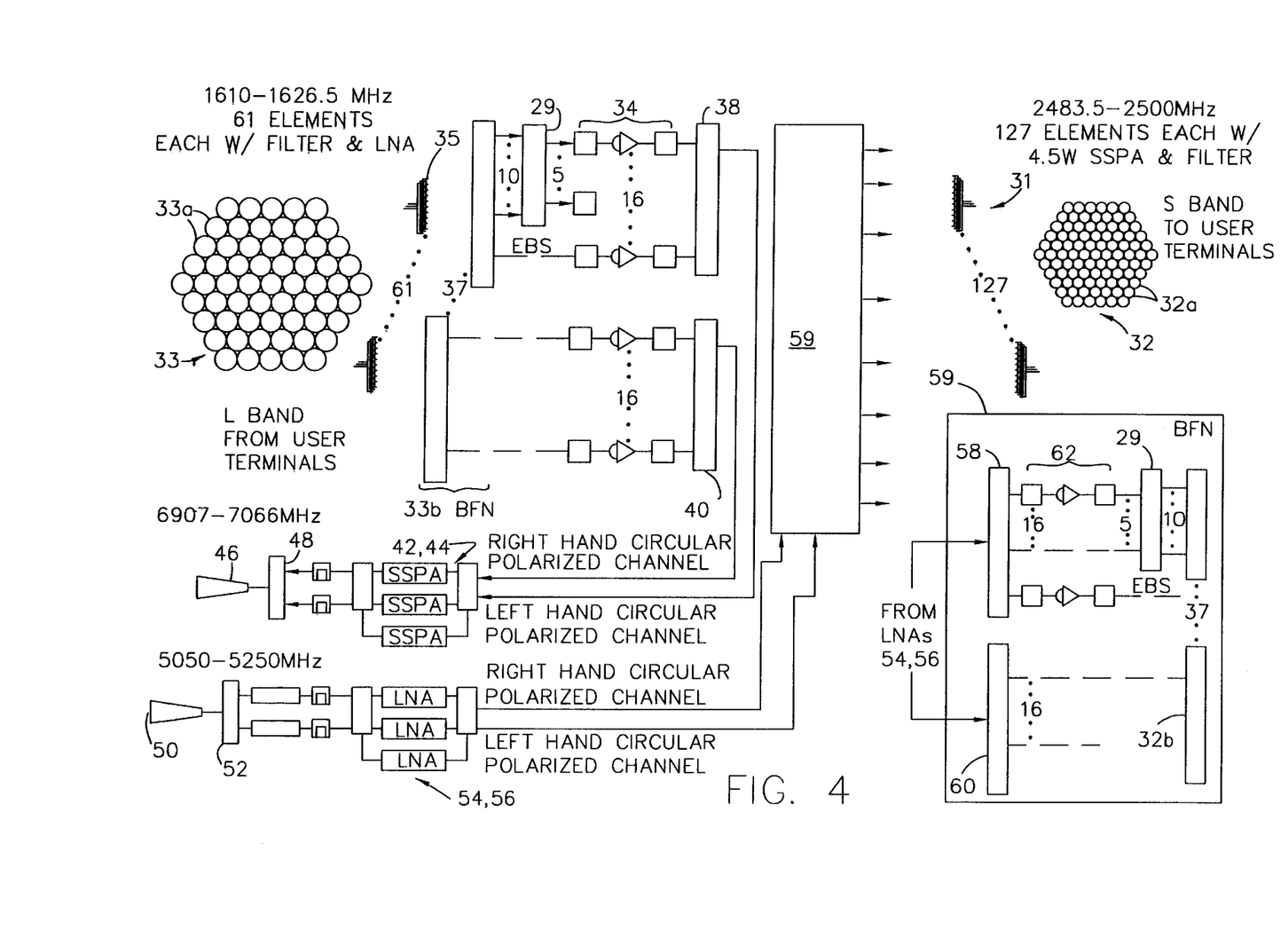
FIG. 4 is a simplified block diagram of an exemplary satellite communications payload that is suitable for practicing this invention.

Referring now to FIG. 4, there is illustrated an exemplary satellite payload providing non-congruent beam coverage. More particularly, the L-band receive feed 33 and the S-band transmit feed 32 couple the uplink and the downlink service links, respectively, to the terrestrial user terminals (fixed or mobile). Feeds 32 and 33 are each a phased array comprised of, by example, 91 elements (32a) and 61 elements (33a), respectively. The elements are packed into a generally hexagonal configuration, and use every one of the 91 or 61 elements for every one of the beams.

Directly coupled to the 61 elements 33a of the receive, feed 33 are low noise amplifiers (LNAS) for receipt o he L-band uplink signals. Directly coupled to the 91 elements 32a of the transmit feed 32 are high power amplifiers (HPAs) for transmitting the S-band downlink signals. The HPAs are capable of transmitting with several different power levels. The LNAs and the HPAs are designed to operate in a linear region wherein the output signal is directly proportional to the input signal. Linear operation preserves the fidelity of the signals transmitted, and also provides the ability for every antenna element to carry multiple independent beams simultaneously.

As the satellite 22 passes over a group of user terminals, the access to the satellite 22 moves from beam to beam in a direction opposite to that of the satellite motion. Thus, the need for transmission power for the S-band downlink from the satellite 22 must also move from beam to beam in a corresponding manner. The communications payload shown in FIG. 4 provides for the available power to be assigned to a particular downlink beam that is illuminating the same ground area as the uplink beam in use. This occurs because the downlink HPAs are associated with each of the downlink feed elements 32a, and thus each element 32a participates in every beam. The power is therefore assigned on a demand basis, automatically in cooperation with the gateways, and without the need for command or logic control.

In greater detail, the phased array feeds 32 and 33 are formed by multiple beam forming networks 32b and 33b, respectively, which establish the direction that each beam points relative to the satellite 22. In the illustrated embodiment there are 32 active uplink and 32 active downlink beams, and thus 32 uplink beam former networks (BFNs) 33b and 32 downlink BFNs 32b.

In one exemplary embodiment of this invention 37 uplink beams are collected by the receive feed 33 from the user signals through the use of 37 uplink BFNs 33b. The number of beams is then reduced to 32 by selecting one from each particular set of five pairs in a 5 pole-10 throw (5P10T) electronic beam switch (EBS) 29. The 32 resultant uplink beams at the outputs of the receive feed elements 33a are divided by 61 power dividers 35, after amplification by the LNAs, into 32 paths that are fed to the BFNs 33b, thereby establishing the direction and shape of each uplink beam. The same is true of the downlink beams, wherein 37 inputs are combined in 91 power combiners and then amplified by the HPAs for transmission by the 91 elements 32a. Since the feed 32 has 37 beams, another 5 pole-10 throw (5P10T) electronic beam switch (EBS) 29 makes selections within five designated pairs of beams (at the periphery of the overall coverage pattern), so that only 32 beams are active at any time.

It should be noted that, for simplicity, the EBSs 29 are shown connected to one polarization only. However, any combination of polarizations can be used.

Transmission between the gateway 24 and the satellite 22 is via the C-band RF links. To accommodate this mode of operation, the L-band signals received by the 32 active beams are frequency division multiplexed (FDM) into two groups of 16 for transmission over the C-band of frequencies. This is accomplished by a plurality of amplifier mixers 34 which operate to up-convert the L-band signals to C-band signals. The frequencies of each of the FDM channels are established by local oscillators 36, in conjunction with the amplifier mixers and associated filters. Multiple channels are combined in individual ones of summing networks 38 and 40 and are provided to power amplifiers (SSPAs) 42 and 44, respectively. The outputs of power amplifiers 42 and 44 are applied to orthogonal channels for transmission to a gateway from antenna 46 (in a frequency band of about 6907 to 7066 MHz). The orthogonal channels are established by a polarizer 48.

Circularly polarized orthogonal signals received from the gateway 24 arrives through antenna 50 (in a frequency band of about 5050 to 5250 MHz), are separated by polarizer 52, amplified by LNAs 54 and 56, and are provided to power dividers 58 and 60, respectively. The outputs of the power dividers 58 and 60 are provided to a plurality of filters and amplifier mixers 62 which, in conjunction with local oscillators 64, down-convert the C-band gateway transmissions to establish the S-band return channels to the beam forming networks 26. Signals from the beam forming networks 32b are collected in the n-way (n=37 in the example) power summers 31 and are provided to the individual elements 32a of the transmit phased array antenna 32.

In the illustrated embodiment the receive phased array 33 may employ both amplitude taper and phase control, while the transmit phased array, due to the significantly higher power requirements, may employ only phase control.

Furthermore, the sizes of the two phased arrays are different, and the transmit phased array 32 is constructed with more elements than the receive phased array (i.e., 91 elements vs. 61 elements). Significantly, the terrestrial beam patterns are not congruent for the uplink and down link beams. That is, both antennas are optimized for their intended applications without regard for maintaining beam congruency.

It is noted that all of the frequencies, bandwidths and the like that are described herein are representative of but one particular system. Other frequencies and bands of frequencies may be used with no change in the principles being discussed. Furthermore, the teaching of this invention is not limited to only the disclosed numbers of satellites, elevation angles, altitudes and the like. Other than CDMA-type systems (for example, TDMA-type systems) can also benefit from the teaching of this invention. Also, and although described in they context of a low earth orbit satellite system, it should be appreciated that the teachings of this invention apply as well to medium earth orbit (MEO), as well as to geosynchronous orbit (GSO), satellite systems.

Furthermore, the teachings of this invention have been thus far described primarily in the context of relatively simple repeater satellites, and the maintenance of the database 25 by the gateway 24 (FIG. 3). It should be realized, however, that in a system that utilizes satellites capable of on-board signal processing-the satellite may determine the RF conditions within the various sub-beams, may maintain the database 25 on-board the satellite, and may itself re-allocate the sub-beams of the forward and/or reverse links, either autonomously or in cooperation with the gateway 24 and/or GOCC 26. In this type of system the on-board satellite processing thus maintains the maps of the sub-beam coverages and routes signals accordingly to maintain connectivity.

The teaching of this invention can also be employed to accommodate ground-based RF "hot spots" by reallocating beams accordingly.

The teaching of this invention is especially advantageous for the case wherein multiple non-geosynchronous orbit satellites project multiple overlapping beams on the earth's surface, with each of the beams being comprised of a plurality of sub-beams, with the beams passing over the earth's surface in different directions. The teaching of this invention furthermore enables a high gain to be achieved, as desired, at the periphery of the beams.

Thus, while the invention has been particularly shown and described with respect to preferred embodiments thereof, it will be understood by those skilled in the art that changes in form and details may be made therein without departing from the scope and spirit of the invention.

What is claimed is:

1. A satellite communications system comprising:
  at least one satellite having a forward beam and a reverse beam that move across the surface of the earth, said forward beam being substantially congruent with said reverse beam at the surface of the earth, each of said beams being comprised of M sub-beams for relaying user communications between a ground station and user terminals, wherein X sub-beams of said forward beam are disposed along an outer perimeter of said forward beam and wherein Y sub beams of said reverse beam are distributed along an outer perimeter of said reverse beam, and further wherein Y is greater than X and less than M.

2. A satellite communications system according to claim 1, wherein M is equal to 16.

3. A satellite communications system according to claim 1, wherein X is equal to 9.

4. A satellite communications system according to claim 1, wherein Y is equal to 15.

5. A satellite communications system according to claim 1, wherein M is equal to 16, X is equal to 9 and Y is equal to 15.

6. A method of operating a satellite communications system comprising the steps of:
  providing at least one satellite in earth orbit; and
  transmitting a forward beam to the surface of the earth and receiving a reverse beam from the surface of the earth, said forward beam being substantially congruent with said reverse beam at the surface of the earth, each of said beams being comprised of M sub-beams for relaying user communications between a ground station and user terminals, wherein X sub-beams of said forward beam are disposed along an outer perimeter of said forward beam and wherein Y sub beams of said reverse beam are distributed along an outer perimeter of said reverse beam, and further wherein Y is greater than X and less than M.

7. A method of operating a satellite communications system according to claim 6, wherein M is equal to 16.

8. A method of operating a satellite communications system according to claim 6, wherein X is equal to 9.

9. A method of operating a satellite communications system according to claim 6, wherein Y is equal to 15.

10. A method of operating a satellite communications system according to claim 6, wherein M is equal to 16, X is equal to 9 and Y is equal to 15.

11. A method of operating a satellite communications system according to claim 6, wherein said satellite is a non-geosynchronous orbit satellite.

* * * * *